(12) United States Patent
Kusama

(10) Patent No.: US 6,259,989 B1
(45) Date of Patent: Jul. 10, 2001

(54) NAVIGATION DEVICE

(75) Inventor: Toshiki Kusama, Tokyo (JP)

(73) Assignee: Mitsubishi Denki K.K., Tokyo (JP)

( * ) Notice: Subject to any disclaimer, the term of this patent is extended or adjusted under 35 U.S.C. 154(b) by 0 days.

(21) Appl. No.: 09/381,698

(22) PCT Filed: Jun. 12, 1998

(86) PCT No.: PCT/JP98/02604
§ 371 Date: Sep. 23, 1999
§ 102(e) Date: Sep. 23, 1999

(87) PCT Pub. No.: WO99/64820
PCT Pub. Date: Dec. 16, 1999

(51) Int. Cl.[7] .......................... G01C 21/00; G01C 22/00; G06F 17/00; G06F 19/00
(52) U.S. Cl. .................. 701/208; 701/208–213; 701/23; 701/201; 340/928; 340/988; 340/990; 340/995
(58) Field of Search ................ 701/20, 201, 208–213, 701/23; 340/995, 990, 928, 988; 342/42; 705/417, 418

(56) References Cited

U.S. PATENT DOCUMENTS

| | | | | |
|---|---|---|---|---|
| 5,490,079 | * | 2/1996 | Sharpe et al. ........................ | 364/467 |
| 5,552,789 | * | 9/1996 | Schuermann ........................ | 342/42 |
| 5,675,494 | * | 10/1997 | Sakurai et al. ...................... | 701/23 |
| 5,878,369 | * | 3/1999 | Rudow et al. ...................... | 701/215 |
| 5,884,217 | * | 3/1999 | Koyanagi ............................ | 701/208 |
| 5,893,045 | | 4/1999 | Kusama et al. ..................... | 701/211 |
| 5,917,436 | * | 6/1999 | Edo et al. ........................... | 340/995 |
| 5,928,305 | * | 7/1999 | Nomura ............................. | 701/207 |
| 5,978,733 | * | 11/1999 | Deshimaru et al. ................ | 701/209 |
| 5,983,158 | * | 11/1999 | Suzuki et al. ...................... | 701/209 |
| 5,987,375 | * | 11/1999 | Tamai ................................. | 701/200 |

FOREIGN PATENT DOCUMENTS

| | | |
|---|---|---|
| 61-205975 | 9/1986 | (JP) . |
| 1137400 | 5/1989 | (JP) . |
| 6231390 | 8/1994 | (JP) . |
| 8261780 | 10/1996 | (JP) . |
| 9171348 | 6/1997 | (JP) . |
| 9269236 | 10/1997 | (JP) . |
| 9288799 | 11/1997 | (JP) . |

* cited by examiner

*Primary Examiner*—William A. Cuchlinski, Jr.
*Assistant Examiner*—Ronnie Mancho

(57) ABSTRACT

The present invention is a navigation device comprising a map data base which stores map data relating to each target geographical point and a display data base which distinguishes between named intersections and general roads and expressways at the geographical point and stores display data for display. The attributes of roads entering the target intersection at the target geographical point are determined, display data stored in the display data base corresponding to the attributes of the determined roads are acquired and named intersections at the target geographical point are displayed based on acquired display data. In this way, it is easy for the user to understand named intersections of the expressway.

17 Claims, 7 Drawing Sheets

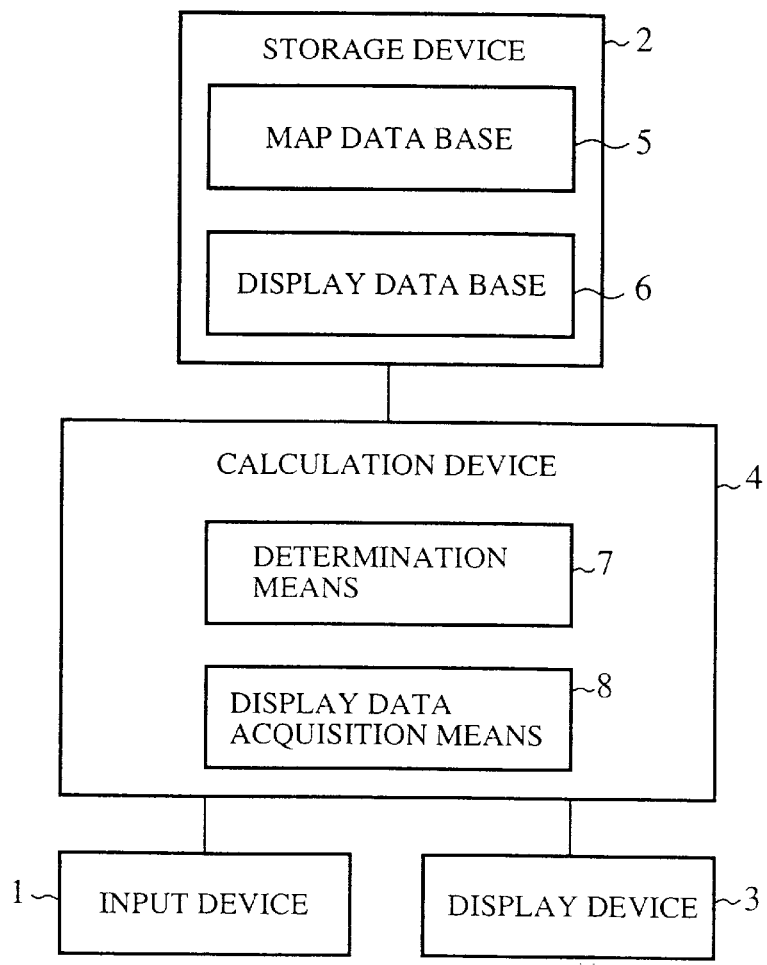

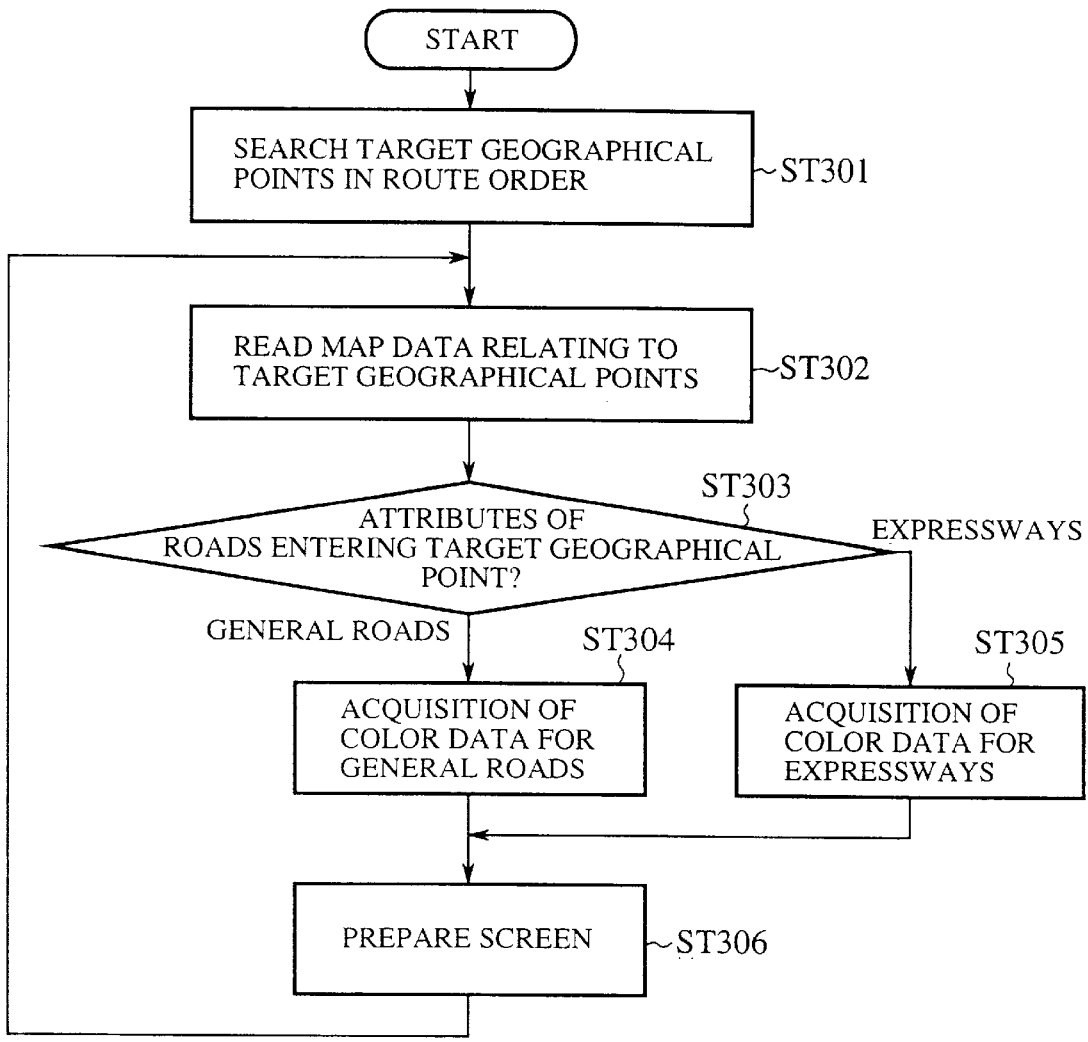

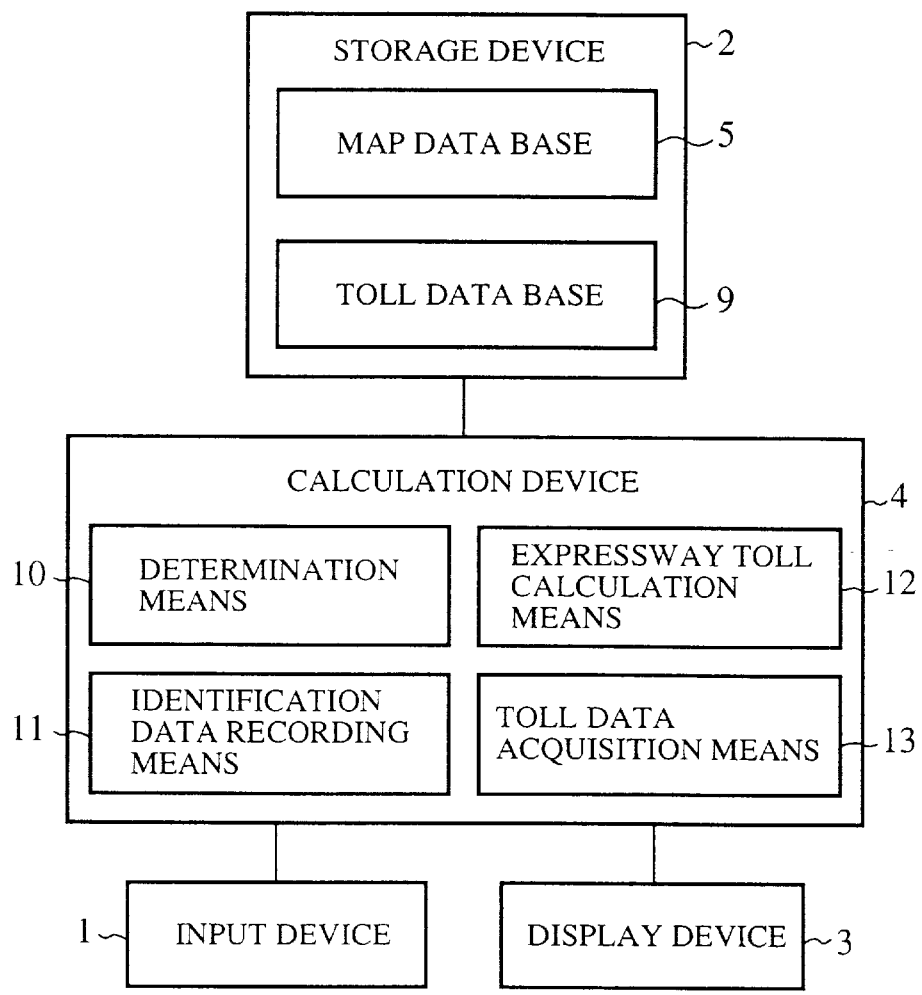

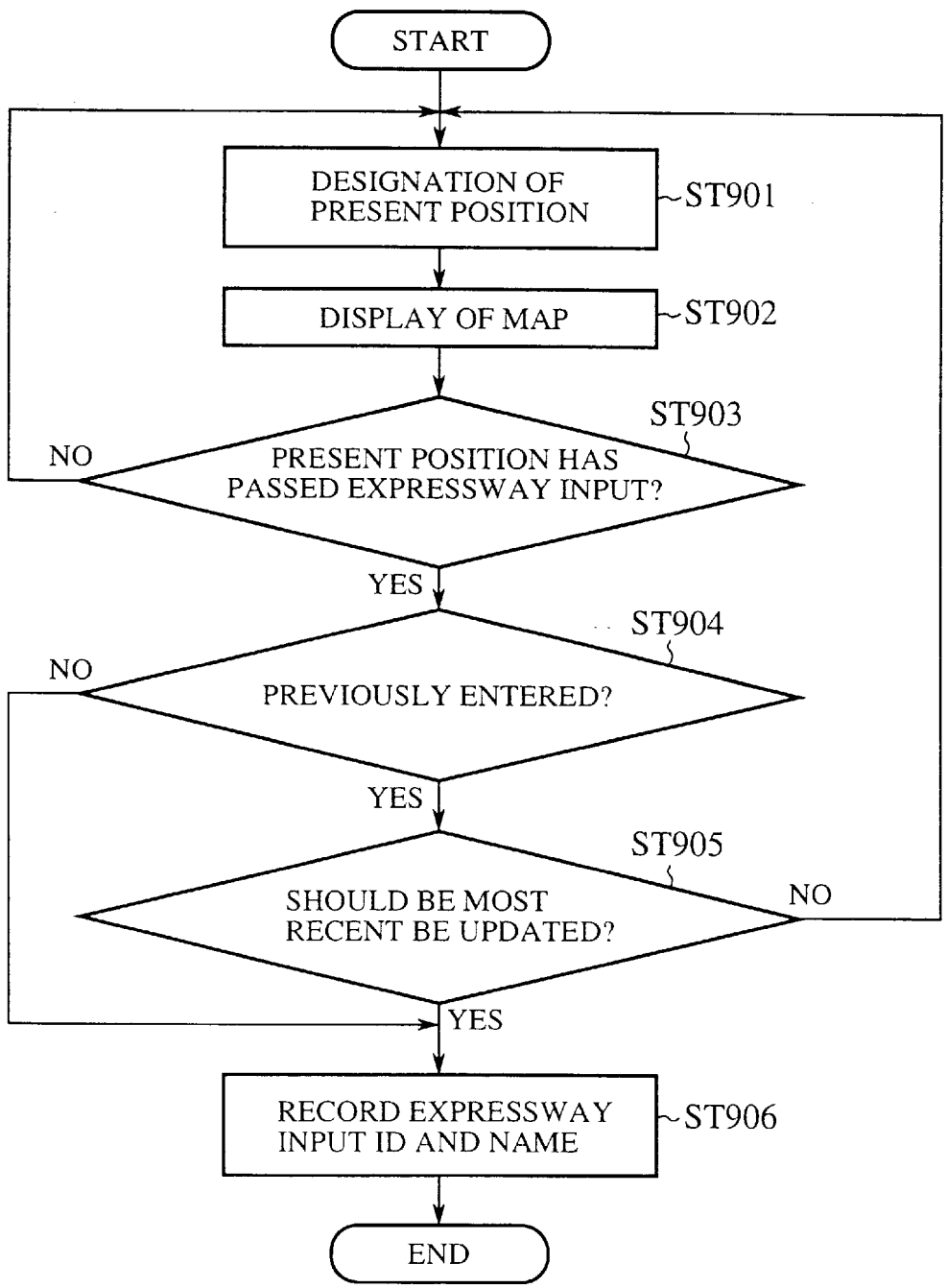

FIG.12
(a)
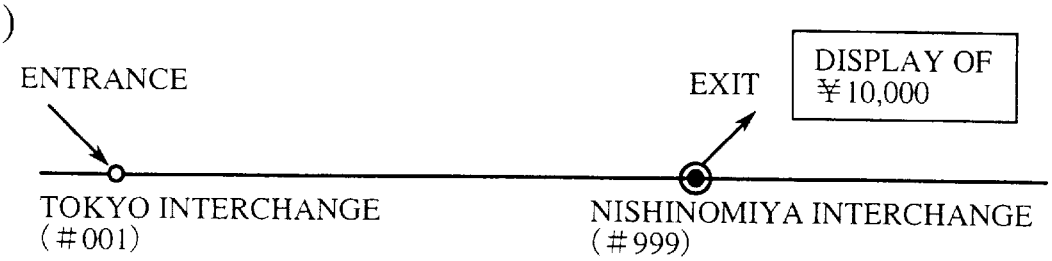
ENTRANCE
TOKYO INTERCHANGE (#001)
EXIT
DISPLAY OF ￥10,000
NISHINOMIYA INTERCHANGE (#999)
(b)
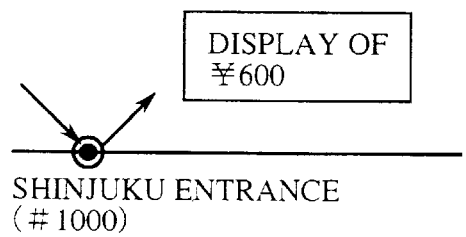
DISPLAY OF ￥600
SHINJUKU ENTRANCE (#1000)
○ ···ENTRANCE
◉ ···TOLLGATE
FIG.13
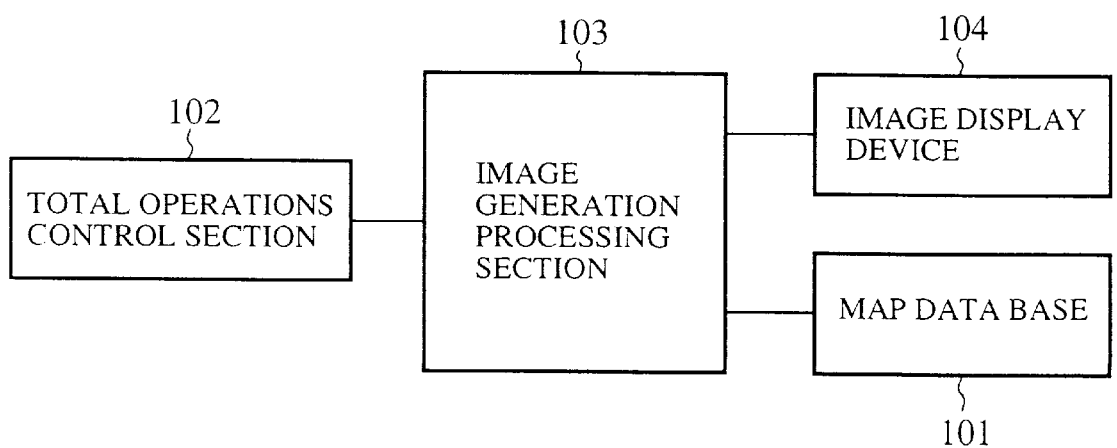

NAVIGATION DEVICE

This application is the national phase under 35 U.S.C. § 371 of PCT International Application No. PCT/JP98/02604 which has an International filing date of Jun. 12, 1998, which designated the United States of America.

FIELD OF THE INVENTION

The present invention relates to a navigation device for displaying information relating to an expressway.

BACKGROUND OF THE INVENTION

FIG. 13 is a block diagram which shows a conventional navigation device. In the figure, 101 is a map data base provided with polygon data for displaying buildings, roads or the like in 3D form. 102 is an overall operational control section which controls the overall operation of the device. 103 is an image generating section which generates images or the like for performing 3D display. 104 is an image display device.

The operation of the invention will now be explained.

The image generating section 103 searches for a map display range based on display viewpoint selection data and vehicle position data supplied through the overall operational control section 102. It reads road data and building polygon data and data for image display, performs conversion to a point coordinate system and perspective projection and generates an image for image display. A 3D map of fixed geographical points is displayed on the image display device 104 by the selection of display viewpoints.

Since conventional navigation devices are constructed as above, the problem has arisen that only the vicinity of the expressway is displayed in 3D form. Thus information related to the expressway is difficult to see and specific information with respect to normal roads other than the expressway can not be obtained.

The present invention is proposed to solve the above problems and provides a device which displays the contents of the expressway display in an easily understood way.

DISCLOSURE OF THE INVENTION

The navigation device of the present invention comprises a map data base which stores map data relating to each target geographical point, a display data base which stores display data for displaying and distinguishing named intersections from general roads and expressways at the target geographical point, a determining device which determines, at the target geographical point, the attribute of roads entering an intersection, a data acquisition display device which acquires display data stored in the display data base corresponding to the attribute of a determined road and a display device which displays named intersections at the target geographical point based on the acquired display data.

Due to the above arrangement, named intersections entering an expressway can be easily understood.

The navigation device of the present invention also comprises a map data base which stores map data related to each target geographical point, a display data base which stores display data for displaying and distinguishing destination names from general roads and expressways at the target geographical point, a determining device which determines, at the target geographical point, whether a destination relates to a general road or whether it relates to an expressway, a display data acquisition device which acquires display data stored in the display data base depending on the result of the determination and a display device which displays a destination at a target geographical point based on the acquired display data.

As a result of the above arrangement, destination names on an expressway can be easily understood.

The navigation device of the present invention also comprises a map data base which stores map data related to each target geographical point, a toll data base which stores data relating to the tolls on the expressway, a determining device which determines whether the present position has passed or is approaching an entrance/exit of an expressway, an identification data recording device which records identification data about the entrance/exit when it is determined that the present position has passed an entrance/exit of an expressway, an expressway toll calculation device which calculates the expressway toll based on toll data stored in the toll data base from the recorded identification data and identification data regarding the exit when it is determined that the present position is in the vicinity of a exit toll collection point, and a display device which displays the calculated expressway toll.

As a result of the above arrangement, the user is informed of expressway payment before toll collection points on the expressway.

The navigation device of the present invention is provided with a toll data acquisition device which acquires corresponding expressway toll data from the toll data base when it is determined that the target geographical point is an entrance toll collection point of an expressway and which displays acquired toll data by the toll data acquisition device.

As a result of the above arrangement, the user is informed of expressway payment before toll collection points on the expressway.

BRIEF DESCRIPTION OF THE DRAWINGS

FIG. 1 is a block diagram of the layout of a navigation device according to a first embodiment of the present invention.

FIG. 2 is figure showing an example of display data stored in a display data base in a first embodiment of the present invention.

FIG. 3 is a flowchart of the operation of a navigation device according to a first embodiment of the present invention.

FIG. 4 is an example of display data stored in a display data base according to a second embodiment of the present invention.

FIG. 6 is a block diagram showing a navigation device according to a third embodiment of the present invention.

FIG. 7 is an example of toll data stored in a toll data base according to a third embodiment of the present invention.

FIG. 8 is an example of toll data stored in a toll data base according to a third embodiment of the present invention.

FIG. 9 is a flowchart showing the operation of a third embodiment of the present invention.

FIG. 12 is a diagram showing the operation of a third embodiment of the present invention.

FIG. 13 is a block diagram showing a conventional navigation device.

DETAILED DESCRIPTION OF THE PREFERRED EMBODIMENTS

Figure 5:
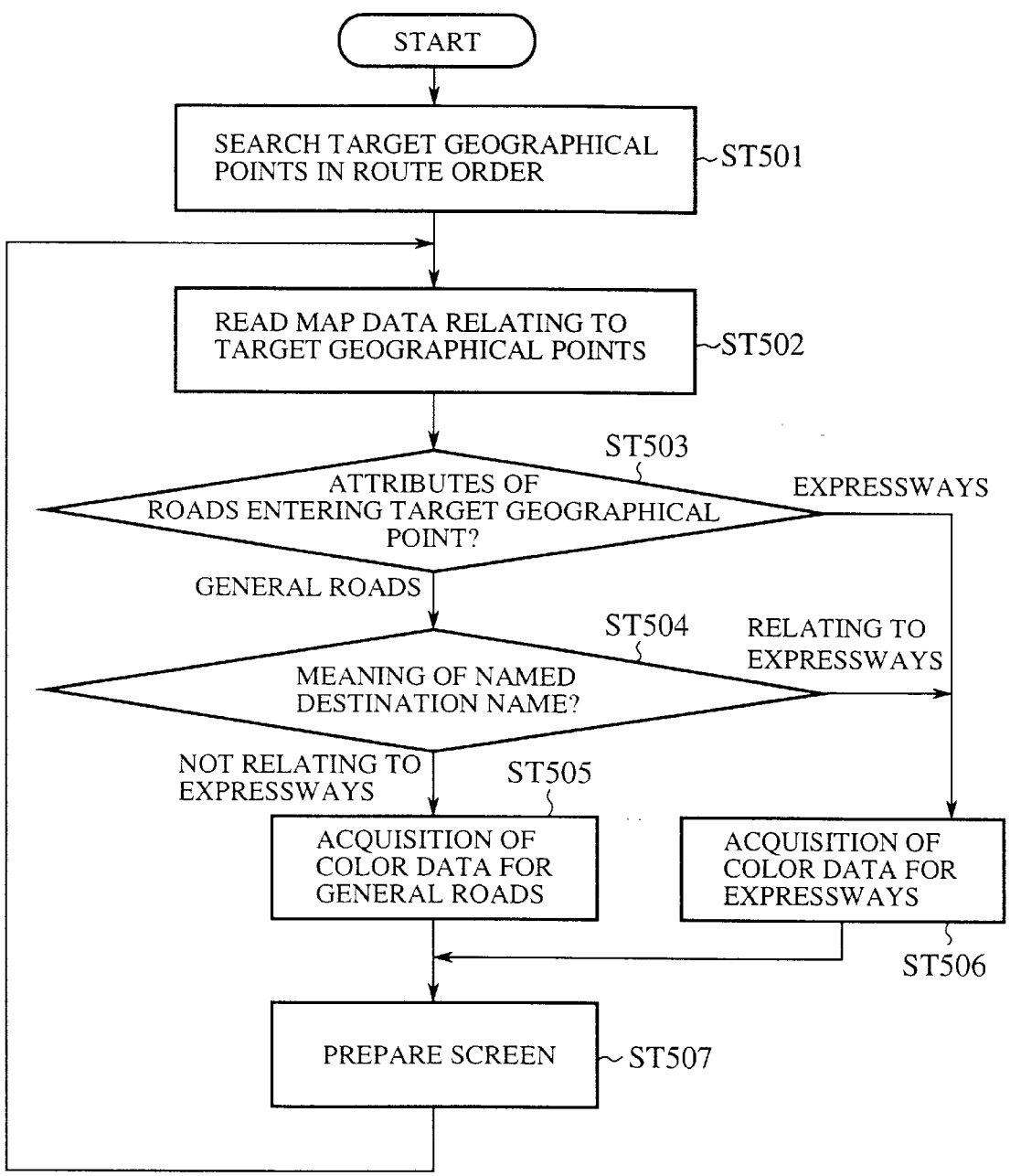
FIG. 5 is a flowchart showing the operation of a second embodiment of the present invention.

On order to explain the invention in greater detail, the preferred embodiments of the invention are explained in detail below with reference to the accompanying figures.

EMBODIMENT 1

FIG. 1 is a block diagram which shows a navigation device according to a first embodiment of the present invention. In FIG. 1, reference numeral 1 denotes an input device such as a keyboard or a pointing device which enables the input of a destination. 2 is a memory device which stores information necessary for the guiding or searching of routes for example a map data base. 3 is a display device such as a CRT or liquid crystal panel which is a means to display and so guide a route. 4 is a calculation device which executes guiding and search processing of routes and controls the above devices.

The memory device 2 is provided with a map data base 5 and a display data base 6.

The map data base 5 stores map data relating to points necessary for the guiding or searching of a route for example each target geographical point. The display data base 6, as shown in FIG. 2, distinguishes named intersections from general roads and expressways at the target geographical point and stores display data in a table form for display for example by highlighted colors.

The calculation device 4 is provided with a determination device 7 and a display data acquisition device 8.

The determination device 7 determines the attribute of the roads entering an intersection at a target geographical point, that is to say, whether a road is a general road or an expressway. The display data acquisition device 8 acquires display data stored in the display data base 6 depending on the attribute of the road which is determined by the determination device 7.

Next the operation of the invention will be explained.

FIG. 3 is a flowchart which shows the operation of a first embodiment of the present invention.

In a Step ST 301, target geographical points are successively searched along a route based on map data in the calculation device 4. When a target geographical point is reached, map data related to that target geographical point is read (Step ST 302). Then the determination device 7 determines the attribute of roads entering a target intersection at a target geographical point (Step ST 303). Next the display data acquisition device 8 acquires display data stored in a display data base 6 depending on the attribute of the road as determined by the determination device 7. For example when the attribute is determined to be a general road, color data for use with general roads is acquired from the display data base 6 (Step ST 304). When the attribute is determined to be an expressway, color data for use with expressways is acquired from the display data base 6 (Step ST 305). In the next step ST (Step ST 306), the scratch drawing preparation is activated for the display of named intersections at the target geographical point. The result is displayed on the display device 3.

As shown above, according to the first embodiment, since named intersections of general roads are displayed in a different color to named intersections of expressways, the two are easily distinguished. The same effect can be achieved by displaying named intersections of general roads and named intersections of expressways in different sizes or different shapes.

EMBODIMENT 2

The second aspect of the navigation device of the present invention is the same as that shown in FIG. 1 except for the fact that, as shown in FIG. 4 the present embodiment stores display data for the purpose of distinguishing a destination name from general roads and expressways at a target geographical point, for example, by highlighted colors. Furthermore the determination device 7 determines whether the destination name at the target geographical point relates to a general road or to an expressway. Then the display data acquisition device 8 acquires display data stored in the display data base 6 depending on the determination result of the determination device 7.

Next the operation of the invention will be explained.

FIG. 5 is a flowchart showing the operation of the second aspect of the embodiment of the present invention.

In a Step ST 501, target geographical points are successively searched along a route based on map data in the calculation device 4. When a target geographical point is reached, map data related to that target geographical point is read (Step ST 502). Then the determination device 7 determines the attribute of destination at a target geographical point (Step ST 503). When the attribute is determined to be a general road, it is determined whether the meaning of the destination name relates to an expressway or not (Step ST 504). When the destination name is determined not to relate to an expressway, color data for use with general roads is acquired from the display data base 6 (Step ST 505). Otherwise when it is determined that the attribute relates to an expressway or to a general road but the meaning of the destination name relates to an expressway, color data for use with expressways is acquired from the display data base (Step ST 506). In the next step (Step ST 507), the screen preparation is activated for the display of destination names at the target geographical point based on display data acquired from the display data acquisition device 8. The result is displayed on the display device 3.

As shown above, according to the second aspect of the invention, since destination names of general roads are displayed in a different color to destination names of expressways, the two are easily distinguished. The same effect can be achieved by displaying destination names of general roads and destination names of expressways in different sizes or different shapes.

EMBODIMENT 3

FIG. 6 is a block diagram showing a navigation device according to a third embodiment of the present invention. The navigation device shown in FIG. 6 is the same as that shown in FIG. 1 and is provided with an input device 1, a memory device 2, a display device 3 and a calculation device 4.

The memory device 2 is provided with a toll data base 9 and a map data base 5. The toll data base 9 stores toll information relating to the expressway. For example, when there is a toll collection point on the exit of the expressway, as shown in FIG. 7, toll data is stored corresponding to the entrance/exit. When there is a toll collection point on the entrance to an expressway, as shown in FIG. 8, toll data is stored about the entrance.

The calculation device 4 comprises a determination device 10, an identification data recording device 11, an expressway toll calculation means 12 and a toll data acquisition device 13. The determination device 10 determines whether the present position has passed or is approaching an entrance/exit of an expressway. When it is determined by the determination device 4 that the present position has passed the entrance of an expressway, the identification data recording means 11 records the identification data of the entrance for example in a operation memory. When it is determined by the determination device 10 that the present position is approaching a exit toll collection point, the expressway toll calculation device 12 calculates the expressway toll based on expressway toll data recorded in the toll data base 9 from identification data about the exit and recorded entrance identification data. The toll data acquisition device 13 acquires corresponding toll data about the expressway from the toll data base 9 when the determination device 10 determines that the target geographical point is an expressway toll collection point.

The operation of the invention will be explained next.

Figure 10:
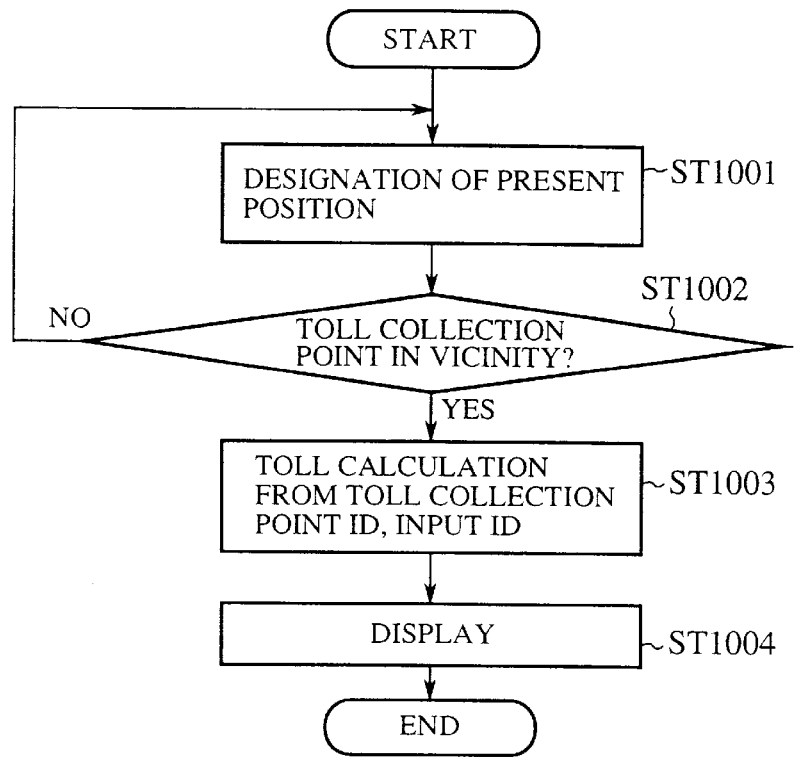
FIG. 10 is a flowchart showing the operation of a third embodiment of the present invention.
Figure 11:
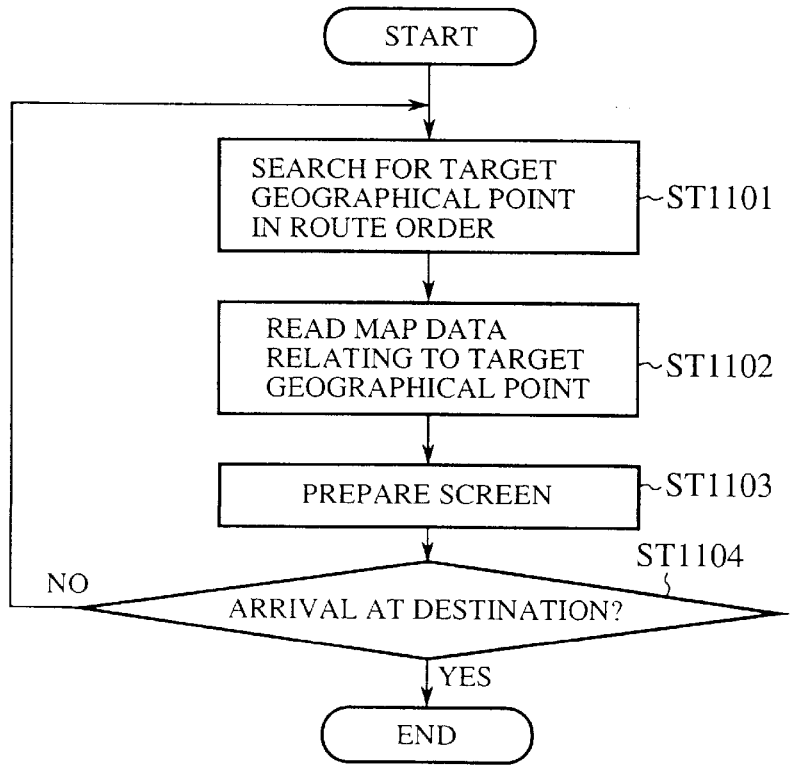
FIG. 11 is a flowchart showing the operation of a third embodiment of the present invention.

FIGS. 9–11 are flowcharts showing the operation of the third embodiment of the present invention. These figures show the sequential operation of the invention.

As shown in FIG. 9, in the calculation means 4, the present position is specified (Step ST 901) and that specified position is displayed on the map (Step ST 902). When the present position passes an entrance to an expressway as shown in FIG. 12(*a*) (Step ST 903), it is determined whether or not it has been recorded that the entrance has been passed (Step ST 904). If it has already been recorded, it is determined whether the vehicle stopped or not or whether the newest item should be renewed from the distance from the toll collection point, the context of the route (Step ST 905). If the entrance has not been passed and should be renewed, the entrance identification data is recorded in the operational memory (for example #001 in FIG. 12(*a*)) (Step ST 906).

Furthermore as shown in FIG. 10, when the present position is specified (Step ST 1001) and is found to be in the proximity of a toll collection point (Step ST 1002), the calculation device 4 calculates the expressway toll based on the expressway toll data recorded in the toll data base 9 from the exit identification data (for example #999 in FIG. 12(*b*)) and from the recorded entrance identification data (for example #001 in FIG. 12(*a*)) (Step ST 1003). This is then displayed (Step ST 1004). For example in FIG. 12(*a*), "¥10,000" is displayed.

Furthermore as shown in FIG. 11, the calculation section 4 searches for a target geographical point in route order based on map data (Step ST 1101). When the target geographical point is determined to be the entry toll collection point of an expressway, data is read with respect to the target geographical point (Step ST 1102). As shown in FIG. 12(*b*), toll collection point identification data is acquired from the map data, and toll data corresponding to this identification data is acquired from the table shown in FIG. 8. Screen preparation for the display of the screen containing the toll data is activated (Step ST 1103) and this is displayed on the display device 3. The above operation is repeated until arrival at the destination (Step ST 1104).

As shown above, according to the third embodiment, the user is informed beforehand of toll collection points at the exits of expressways or the toll collection points on the entrances to expressways. Thus the user can prepare payment before the toll collection point.

It is also possible to display other information relating to the toll collection point, for example the method of payment (cash, card, automatic collection system, ticket inspection etc.) whether there is a toll collection point for right- or left-hand drive cars or the like. At this time especially when the method of toll payment is displayed, the user can decided in what form to prepare the toll before the toll collection point and thus can prepare an appropriate payment medium.

INDUSTRIAL APPLICABILITY

As shown above, the navigation system of the present invention distinguishes between named intersections and general roads and expressways at a target geographical point and displays destinations at the target geographical point. Thus it clearly guides the driver in the desired direction.

What is claimed is:

1. A navigation system comprising:

a map data base which records map data relating to each target geographical point;

a display data base which distinguishes between the name of an intersection of general roads and the name of an intersection of expressways at a target geographical point and stores display data for their display;

a determination device which determines an attribute of a road entering a target intersection at the target geographical point;

a display data acquisition device which acquires display data stored in said display data base depending on the attribute of a road determined by said determination device; and a display device which displays an intersection name at said target geographical point based on display data acquired by said display data acquisition device.

2. A navigation device comprising:

a map data base which records map data relating to each target geographical point;

a display data base which distinguishes between destination names relating to general roads and destination names relating to expressways at a target geographical point and stores display data for their display;

a determination device which makes a determination on whether a destination name at said target geographical point is related to a general road or whether it is related to an expressway;

a display data acquisition device which acquires display data stored in said display data base depending on the determination made by said determination device; and a display device which displays a destination name at said target geographical point based on display data acquired by said display acquisition device.

3. A navigation device which comprises:

a map data base which stores map data related to a target geographical point;

a toll data base which stores expressway toll data;

a determination device which determines whether the present position has passed an entrance or is approaching an exit toll collection point of an expressway;

an identification data recording device which records said entrance identification data when a present position is determined to have passed an expressway entrance by said determination device;

an expressway toll calculation device which calculates an expressway toll based on expressway toll data recorded in said toll data base from exit toll collection point identification data and said recorded entrance identification data when it is determined by said determination device that the present position is approaching an exit toll collection point; and a display device which displays an expressway toll calculated by said expressway toll calculation device.

4. A navigation device as defined by claim 3, further comprising a toll data acquisition device which acquires corresponding expressway toll data from said toll data base when it is determined that the target geographical point is an expressway entrance toll collection point, and wherein said display device displays said acquired toll data.

5. A navigation system as defined by claim 1, wherein said attribute of a road corresponds to whether a road is a general road or an expressway.

6. A navigation system as defined by claim 1, wherein said display data includes one of color, size, and shape of said intersection name depending on the attribute of a road determined by said determining device.

7. A navigation system as defined by claim 2, wherein said display data includes one of color, size, and shape of said destination name depending on the determination made by said determining device.

8. A navigation device as defined by claim 3, wherein said expressway toll data includes method of payment for a toll collection point, and wherein said display device displays said method of payment for a toll collection point.

9. A navigation device as defined by claim 3, wherein said expressway toll data includes whether a toll collection point is for right- or left-hand drive cars, and wherein said display device displays whether a toll collection point is for right- or left-hand drive cars.

10. A navigation system comprising:

a determination device which makes a determination on whether a road entering a target intersection at a target geographical point is a general road or an expressway;

a display device which displays a name of said target intersection at said target geographical point based on display data depending on the determination made by said determination device.

11. A navigation system as defined by claim 10, wherein said display data includes one of color, size, and shape of said intersection name depending on the determination made by said determination device.

12. A navigation device comprising:

a determination device which makes a determination on whether a destination name at a target geographical point is related to a general road or an expressway;

a display device which displays a destination name at said target geographical point based on display data depending on the determination made by said determination device.

13. A navigation system as defined by claim 10, wherein said display data includes one of color, size, and shape of said destination name depending on the determination made by said determination device.

14. A navigation device comprising:

a determination device which determines whether the present position of a vehicle is approaching a toll collection point;

an identification data recording device which records identification data of a toll collection point when a present position is determined to have passed the toll collection point by said determination device;

a toll calculation device which calculates a toll based on said toll collection point identification data when it is determined that the present position is approaching said toll collection point;

a display device which displays the expressway toll calculated by said expressway toll calculation device.

15. A navigation device as defined by claim 14, further comprising a toll data base which stores toll data corresponding to a plurality of toll collection points, wherein said toll calculation device calculates the toll based on toll data corresponding to said toll collection point identification.

16. A navigation device as defined by claim 14 further comprising a map data base which stores map data related to a target geographical point.

17. A navigation device as defined by claim 16 further comprising a toll data acquisition device which acquires corresponding expressway toll data from said toll data base when it is determined that the target geographical point is a toll collection point.

\* \* \* \* \*